No. 635,847. Patented Oct. 31, 1899.
C. N. DUTTON.
HYDRAULIC ACCUMULATOR.
(Application filed Aug. 5, 1897.)
(No Model.) 6 Sheets—Sheet 1.
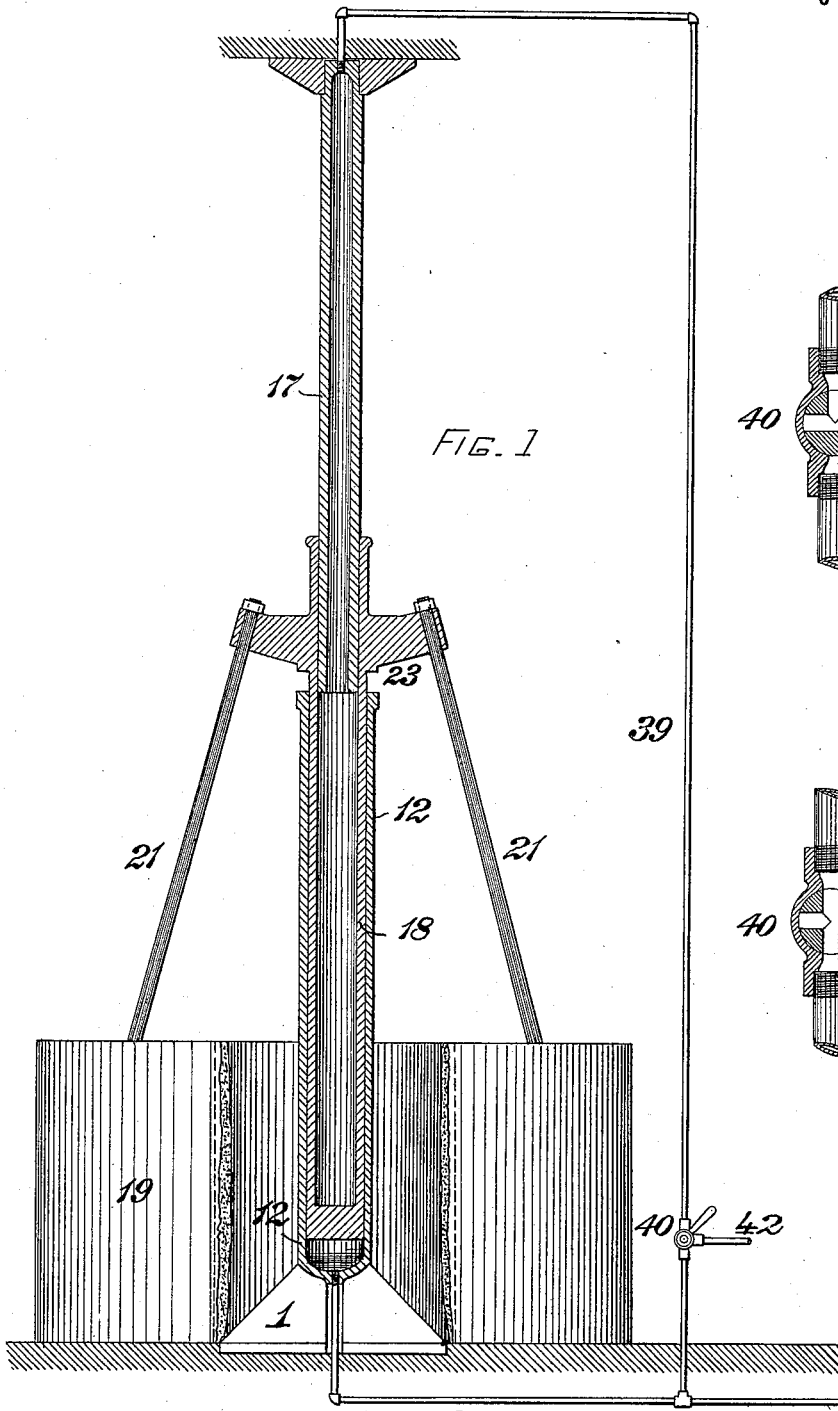
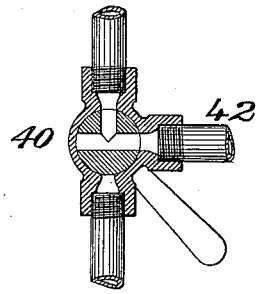
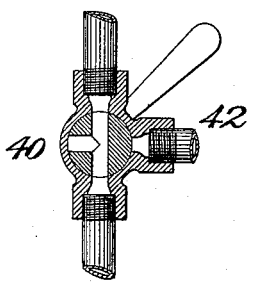
WITNESSES: INVENTOR

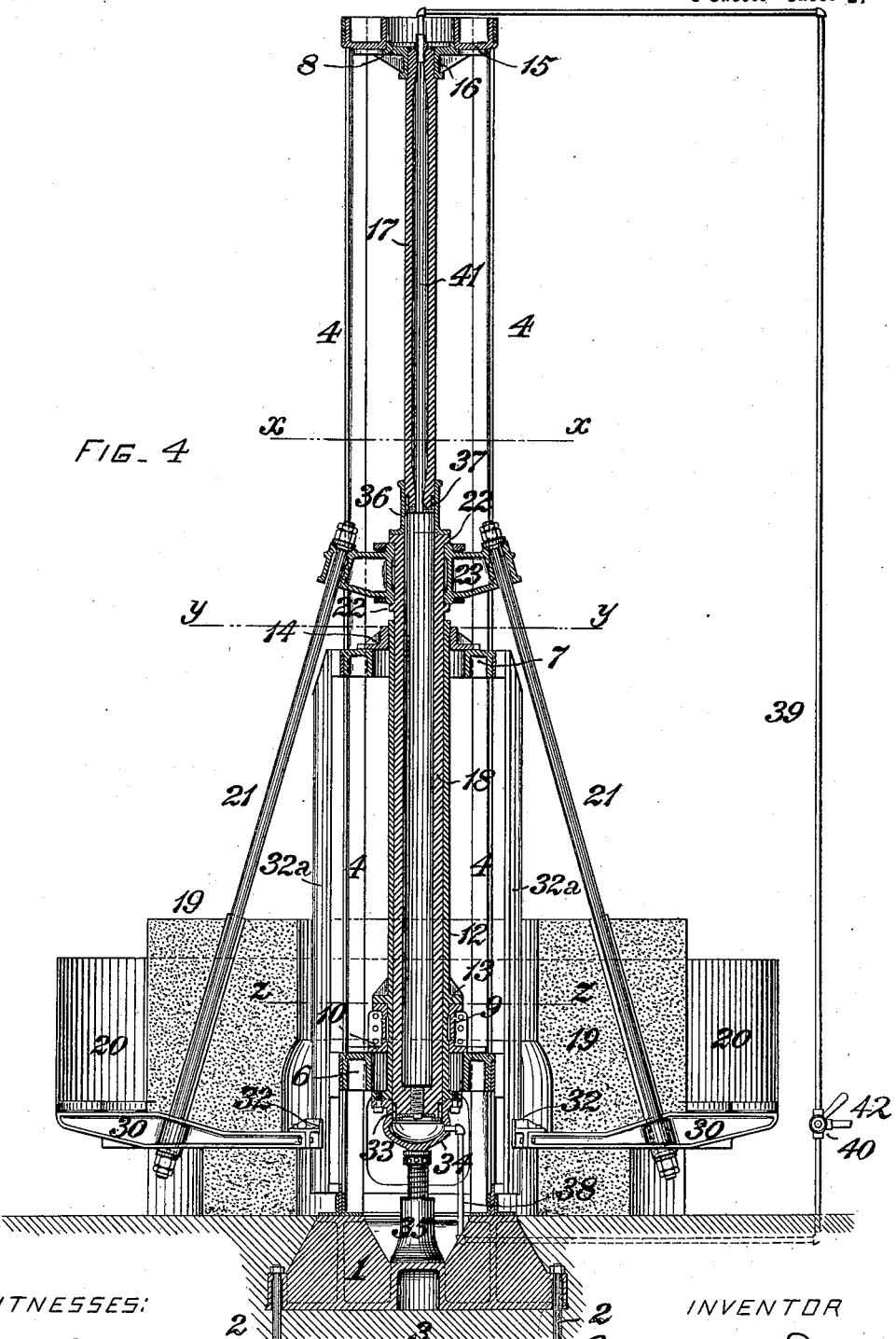

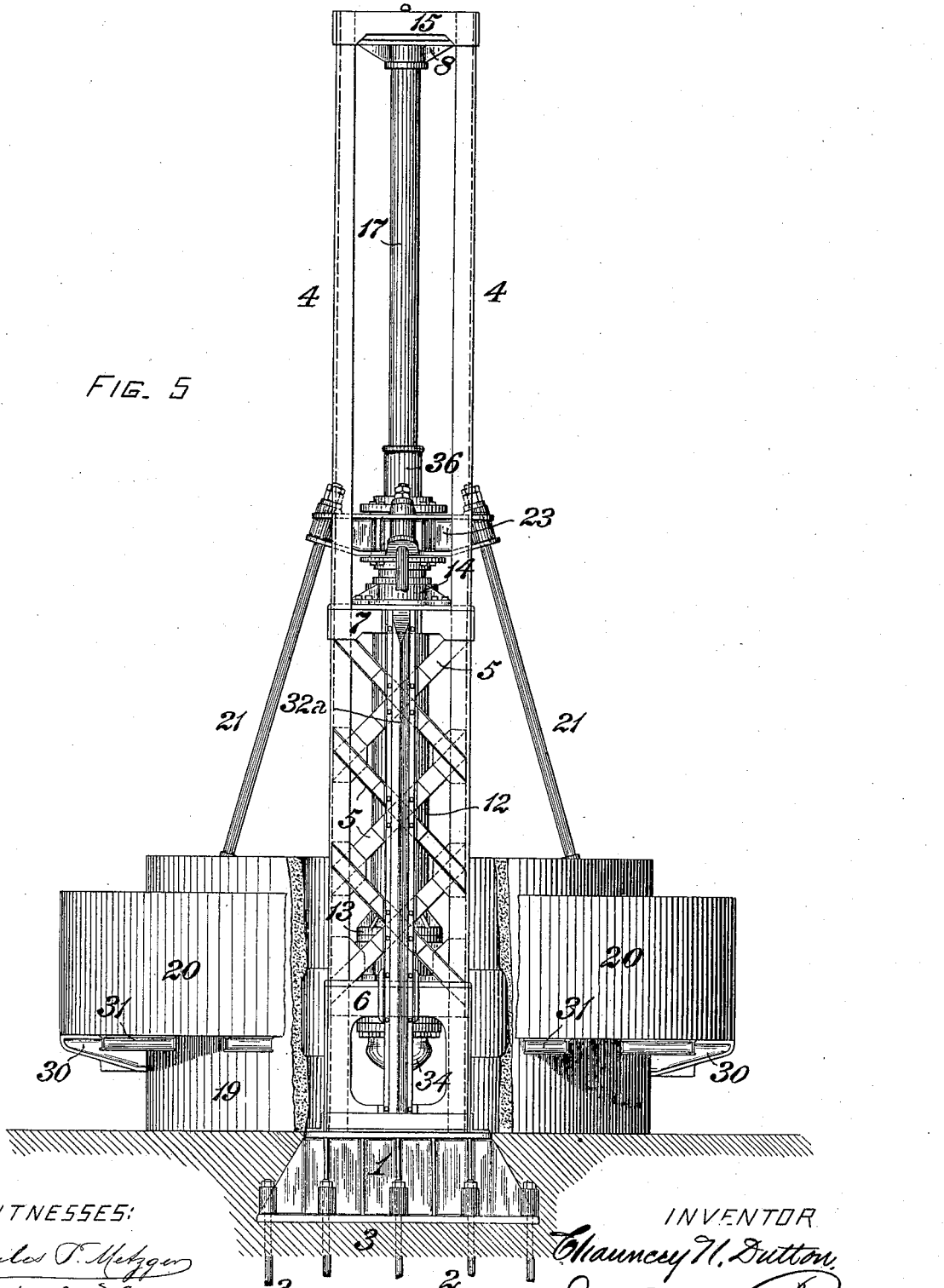

No. 635,847. Patented Oct. 31, 1899.
C. N. DUTTON.
HYDRAULIC ACCUMULATOR.
(Application filed Aug. 5, 1897.)
(No Model.) 6 Sheets—Sheet 4.

WITNESSES:
INVENTOR
Chauncey N. Dutton,
ATT'Y.

No. 635,847. Patented Oct. 31, 1899.
C. N. DUTTON.
HYDRAULIC ACCUMULATOR.
(Application filed Aug. 5, 1897.)
(No Model.) 6 Sheets—Sheet 5.

WITNESSES:

INVENTOR
Chauncey N. Dutton
ATT'Y.

No. 635,847. Patented Oct. 31, 1899.
C. N. DUTTON.
HYDRAULIC ACCUMULATOR.
(Application filed Aug. 5, 1897.)
(No Model.) 6 Sheets—Sheet 6.
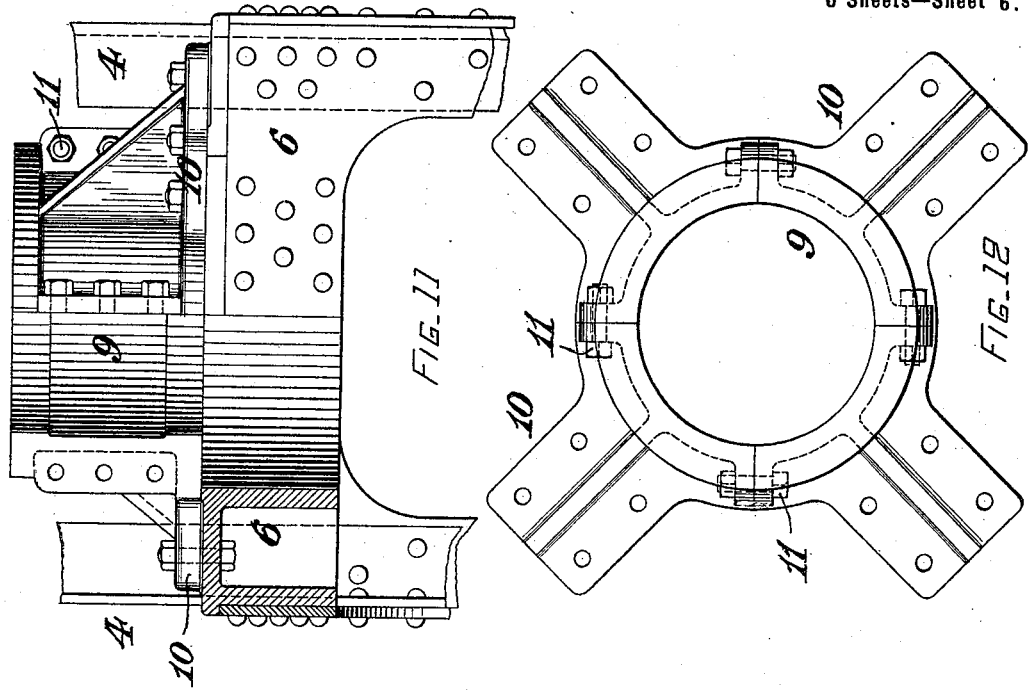
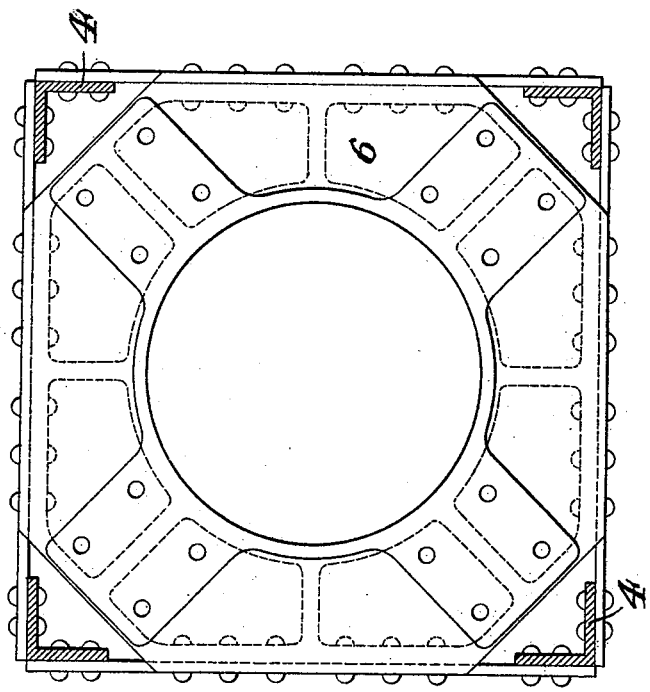
WITNESSES:
INVENTOR
Chauncey N. Dutton,
by J. Snowden Bell,
Att'y.

UNITED STATES PATENT OFFICE.

CHAUNCEY N. DUTTON, OF NEW YORK, N. Y.

HYDRAULIC ACCUMULATOR.

SPECIFICATION forming part of Letters Patent No. 635,847, dated October 31, 1899.

Application filed August 5, 1897. Serial No. 647,146. (No model.)

*To all whom it may concern:*

Be it known that I, CHAUNCEY N. DUTTON, of the city, county, and State of New York, have invented a certain new and useful Improvement in Hydraulic Accumulators, of which improvement the following is a specification.

The object of my invention is to provide a hydraulic accumulator specially designed for very heavy and powerful work which shall be of simple, substantial, and desirable construction, capable of removal of its pedestal and working parts and connections without removal of its weight or load and of removal and replacement of its packings without removing its weight, cylinder, or rams, and which in operation is adapted to generate for desired utilization either a higher or a lower pressure at the option of the operator.

To this end my invention, generally stated, consists in the combination of a frame or support for sustaining the reactions, a lower weighted hydraulic member, an upper hydraulic member adapted to exert pressure upon the lower hydraulic member by the transfer of fluid from the lower weighted hydraulic member to the upper hydraulic member, and a valve-controlled pipe connecting said members; also, in certain novel devices and combinations of members in the structure of the apparatus whereby greater strength and compactness are attained and the convenient removal and replacement of working parts and packings are facilitated.

The improvement claimed is hereinafter fully set forth.

Figure 6:
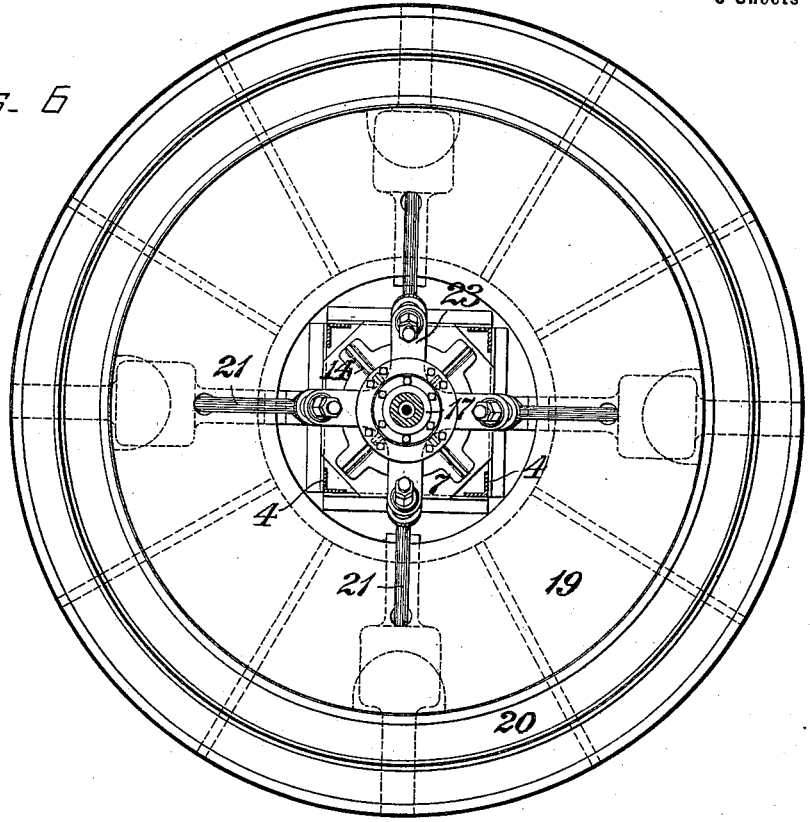
Figure 7:
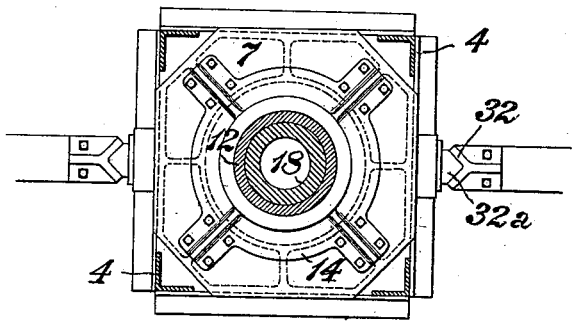
Figure 8:
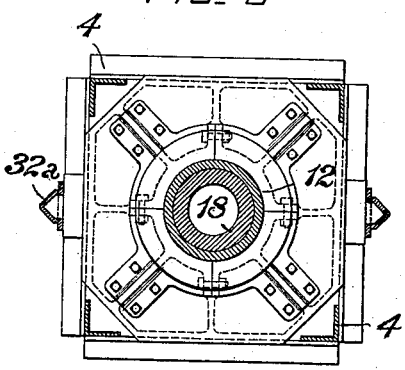
Figure 9:
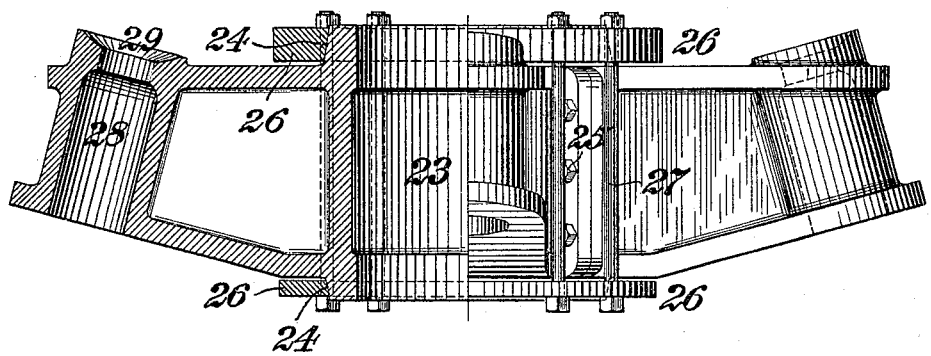
Figure 10:
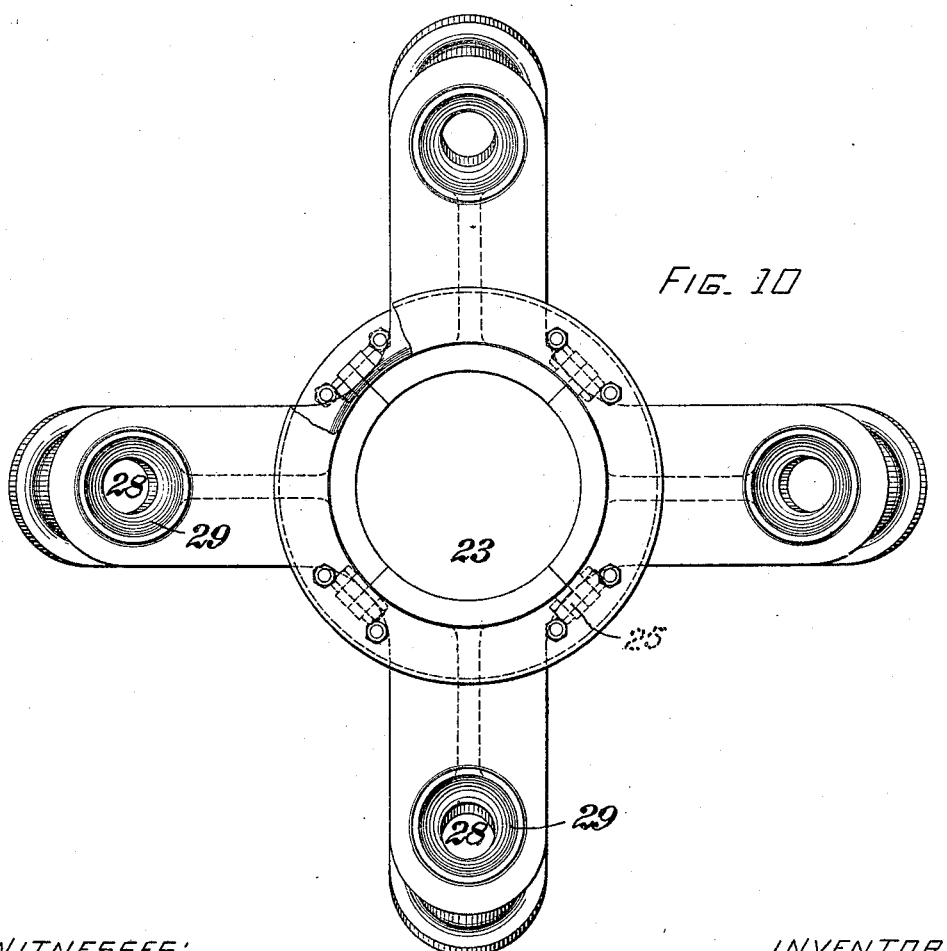

In the accompanying drawings, Figure 1 is a vertical central section through a hydraulic accumulator embodying my invention, detailed structural features being omitted to promote clearness of illustration of the general principles of the invention; Figs. 2 and 3, transverse sections, on an enlarged scale, through the controlling-valve of the intensifier branch pipe in closed and open positions, respectively; Fig. 4, a vertical central section through a hydraulic accumulator, illustrating a suitable and desirable form for the practical application of the invention; Fig. 5, a side view in elevation of the same with a portion of the weight broken away; Fig. 6, a horizontal section at the line $x\ x$ of Fig. 4; Figs. 7 and 8, similar sections, on an enlarged scale, through the cylinder and movable ram and the fixed ram at the lines $y\ y$ and $z\ z$, respectively, of Fig. 4; Fig. 9, a view, half in vertical central section and half in elevation, of the carrier from which the weight is suspended; Fig. 10, a plan or top view of the same; Fig. 11, a view, half in vertical central section and half in elevation, of the main-cylinder bearing-plate and its supporting-table; Fig. 12, a plan or top view of the main-cylinder bearing-plate, and Fig. 13 a similar view of the supporting-table of said plate.

In the practice of my invention I provide a suitable frame or support for sustaining the weight and reaction of the hydraulic members and guiding their motions in right lines, a lower hydraulic member suitably weighted to give the lower of the two desired pressures, an upper hydraulic member, and a pipe controlled by a valve, by which fluid may pass from the lower or accumulator member to the upper or intensifying member.

When it is desired to utilize for work the lower of the two pressures, the valve in the connecting-pipe is closed, cutting off communication between the two hydraulic members, the resulting pressure being simply that due to the weight acting on the accumulator.

When it is desired to use the higher of the two pressures, the valve is opened, establishing communication between the two hydraulic members, in which case a part of the fluid expelled from the cylinder of the accumulator member by the falling weight passes through the connecting-pipe into the cylinder of the intensifying member and, exerting pressure therein upon the lower hydraulic member, intensifies and raises the hydraulic pressure to the higher of the two pressures for which the machine is designed.

The specific form of my invention which gives the cheapest, most compact, and economical machines is exemplified in the drawings, which show a substantial cast-metal base or pedestal 1, built into and secured by bolts 2 to a suitable foundation 3, of masonry, concrete, or other material. A vertical frame 4, preferably composed of steel angles, is secured to the pedestal and laced or latticed in its lower portion to as great a height as is admissible without interference with the weight-suspending members by diagonal braces 5, as well as connected by supporting-tables 6 7 and an upper bearing-plate 8, so as to constitute a structure of sufficient strength and stiffness to sustain the reactions of the hydraulic members and resist accidental forces tending to distort it or wind-pressure when erected in an exposed position. A supporting-table 6, the vertical portion of which is of open or skeleton form, in order to give convenient access to its interior, is secured to the pedestal 1 and to the vertical frame members 4.

A cast-metal lower bearing-plate, consisting of an annular body 9 and laterally-extending lugs 10 and made in one or more sections, preferably in the form of a split sleeve-block, abutting in planes diametrical to its body and connected by bolts 11, is secured upon the top of the table 6, adjusts centrally therein, and supports on its annular upper face a main hydraulic cylinder 12, which passes through the body of the bearing-plate 9 and a central opening in the table 6 and is supported thereon and adjusted centrally therein by the interposition of the split sleeve-blocks or bearing-plate 9 between the plate 6 and an annular flange 13, formed on the cylinder 12. After the cylinder is adjusted it is firmly held in place by bolting the sleeve-blocks to the plate 6 and, if desired, by dowel-pins. The upper end of the cylinder may be similarly centrally adjusted. The upper end of the cylinder 12 passes through and is guided and steadied in an annular guide-plate 14, which is bolted to a supporting-table 7, connected to the frame members 4. An upper bearing-plate 8 is connected to the upper ends of the frame members through an intermediate table 15, said bearing-plate having a central sleeve or socket 16, in which a fixed intensifier-ram 17 is secured in line axially with the main hydraulic cylinder 12. The movable ram 18 of the cylinder 12 is made tubular in order to form an intensifier-cylinder, which receives and traverses on the fixed intensifier-ram 17.

The weight 19, by which the ordinary or lesser of the two pressures within the capacity of the accumulator is imposed upon the movable ram 18, is of annular form surrounding the frame 4 and is suspended from the movable ram, as presently to be described. It is preferably composed of an annular integral block of concrete and may, as shown, be provided with a supplemental section in the form of an annular tank 20 to receive a load of water when a temporary increase of pressure above that due to the main body of the weight is desired. The weight 19 is suspended below a point of support on the movable ram by suspension-rods 21, so as to be practically in a position of stability and to lessen the duty of and strain upon the guides by which its truly vertical movements upon the frame are assured.

To admit of the ready and convenient attachment and detachment of the weight 19 to and from the movable ram 18, a recessed or shouldered head is formed at the outer end of said ram by projecting collars 22, between which is secured the carrier 23, from which the weight is suspended. The carrier is preferably in the form of an annular body, with four radially-projecting arms cast in one piece, finished, and cut apart on planes transverse to its axis. The inner surface of the body of the carrier is finished to fit the head of the ram, and tapered or conical outer bearing-faces 24 are formed on the ends of the body. The sections of the carrier are placed in position upon the head of the ram and distanced by liners or otherwise, as may be required, being then held together by bolts 25 passing through lateral flanges on the body. Steel rings 26, which are preferably rolled and weldless and are bored out to fit the bearing-surfaces 24, are then fitted on said surfaces and drawn into close contact therewith by through-bolts 27. The sections of the carrier are thus firmly held together by the rings 26, and the connection is absolutely safe from slipping, yielding, or unscrewing from any accidental cause or vibration.

It will be seen that normally the weight tends to rotate the arms of the carrier about the supporting lower collar 22 and presses the lower ends of said arms against the cylinder 12 and that the upper ring 26 is in tension and that the lower ring is free from strain, except such initial strain as may be due to tightening the bolts 27. It will be obvious, therefore, that the lower of the two rings 26 will not be strained, except in the case of accident, and might be dispensed with and that the lower abutment of the bolts 27 might be on a projection from the head of the ram 12—as, for instance, on the lower collar 22—were it extended outwardly for that purpose. The use of both rings, however, while not absolutely essential, is desirable to provide the greatest possible rigidity and security in the attachment of the carrier 23.

Sockets 28, having spherical-faced bearing-surfaces 29 to receive corresponding heads on the suspension-rods 21, are formed in the outer ends of the arms of the carrier, and the lower ends of the suspension-rods bear upon plates 30, built into the concrete weight-block and having spherical-faced bearing-surfaces similar to those of the carrier. The bearing-plates 30 are in the form of beams, which extend outwardly and support the annular tank 20, for which additional support is provided by intermediate I-beams or girders 31 built into or otherwise attached to the weight. Guide-faces 32, of V or otherwise recessed section, fixed upon the inner ends of two or more of the bearing-plates, fit against and traverse on corresponding vertical guide-bars 32ª, fixed to the frame members 4.

While there is normally no pressure or very slight pressure upon the guides 32 or 32ª, wind-pressure upon the weight 19 may induce considerable pressure thereon. It is impossible to truss or brace the upper part of the frame 4, through which the arms of the carrier 23 traverse. In the drawings, therefore, the guides 32ᵃ on the frame are shown as confined to the lower trussed portion thereof, freeing the upper untrussed portion from the wind strains originating in the large members of the apparatus.

In order to render the packing of the movable ram 18 conveniently accessible without removing any of the heavy parts of the apparatus, the packing 33 is located on the lower end of the ram and the lower end of the main hydraulic cylinder 12 is closed by a removable bonnet 34. When the accumulator-weight is depressed, the packing lies within the bonnet, and on the removal of the bonnet the end of the ram carrying the packing projects and is exposed, so as to be readily accessible. The bonnet is made self-centering upon the cylinder and is connected thereto by studs. To relieve the cylinder from longitudinal strain due to the bonnet, an adjustable support—as, for example, a screw-jack 35—is provided, which support rests upon the pedestal or foundation and is brought to a bearing against the bonnet, taking the pressure thereon and transferring it to the foundation and relieving the cylinder from longitudinal strain.

To provide for conveniently packing the fixed intensifier-ram 17, the outer end of the movable ram 18 is provided with a removable sleeve or nozzle 36, which is centered on and bolted to the ram 18. The length of the sleeve 36 is such that when the weight is at its lowest point the lower end of the intensifier-ram is within the sleeve at some distance above its connection with the ram 18. By unbolting the sleeve 36 and slipping it up on the intensifier-ram the packing 37 of said ram is fully exposed and readily accessible for renewal or repair.

The hydraulic pressure-pipe 38, through which communication for water is established between the main hydraulic cylinder 12 and the point of utilization of power, communicates by a branch pipe 39, governed by a controlling-valve 40, with a passage 41, extending through the fixed intensifier-ram 17 to the intensifier-cylinder space within the movable ram 18. The valve 40 is a three-way valve, as shown in Figs. 2 and 3, and connects by a pipe 42 with a suitable elevated circulating-tank, so that when the hydraulic members 12 and 18 are disconnected, as shown in Fig. 2, the ram 18 can move upward without encountering undue resistance and downward without tending to cause a vacuum in the cylinder formed therewithin, fluid at such times circulating freely between the tank and the cylinder formed in the ram 18. At such times the pressure on the main hydraulic cylinder is that which is due simply to the weight of the movable ram 18, the load-weight 19, and the parts connected to and moving therewith. When, however, the controlling-valve is opened, as in Figs. 1, 3, and 4, the connection with the circulating-tank is closed and water or other fluid from the main cylinder 12 passes through the connecting-pipes 39 and passage 41 into the intensifier-cylinder and exerts a pressure therein supplemental to the action of the weight, thereby increasing the pressure in the main cylinder 12, which increase again acts in the intensifier-cylinder, and so on indefinitely, the action being on the mathematical principle of the series—for example, assuming the transverse sectional area of the intensifier-cylinder to be one-third that of the main hydraulic cylinder, if the normal pressure in the main cylinder, due to the imposed weight, be one thousand pounds, then when the controlling-valve is open a pressure of one thousand pounds is exerted in the intensifier-cylinder equal in effect to one-third of the effect of the weight, which pressure increases the pressure in the main cylinder one-third. This increase of one-third similarly acts in the intensifier-cylinder and increases the pressure one-ninth, and so on. Thus the original pressure is intensified in the ratio of one to the series one plus one-third plus one-ninth plus one twenty-seventh plus one eighty-first, &c., the sum of which is one and one-half, and the effect of opening the valve is to increase the pressure from one thousand to fifteen hundred pounds.

The action of the intensifier-cylinder and ram may also be readily understood from an explanation on the basis of work done. If the transverse area of the intensifier-cylinder be one-third that of the main cylinder, then when the valve is open a fall of the weight through unit distance is accompanied by a transfer of one-third of a unit of fluid to the accumulator-cylinder and two-thirds of a unit through the pressure-pipe to the point at which the power is to be exerted. Inasmuch as two-thirds of the volume of fluid displaced is used to do work and one-third is used to intensify the action of the other two-thirds, it is evident that the intensification is one-half, and so for any proportion of main and intensifier cylinders which may be adopted.

It will be seen that the important capability in practice of generating a higher or a lower pressure, as desired, is attained without necessitating the employment of additional moving members and that the apparatus is free from complication or structural peculiarities involving undue expense or liability to breakage or derangement.

I claim as my invention and desire to secure by Letters Patent—

1. In a two-pressure hydraulic accumulator, the combination of a support, a lower weighted hydraulic member, an upper hydraulic member adapted to act on the lower member, and a valve-controlled pipe connecting the two members.

2. In a two-pressure hydraulic accumulator, the combination of a lower hydraulic member, a frame, an annular weight surrounding said frame and suspended on the lower hydraulic member, an upper hydraulic member adapted to act on the lower hydraulic member, and a valve-controlled pipe for the passage of fluid from the lower to the upper member.

3. In a two-pressure hydraulic accumulator, the combination of a frame, a lower hydraulic member, an annular weight suspended on the lower hydraulic member, guides on the weight and on the frame, an upper hydraulic member adapted to act on the lower hydraulic member, and a valve-controlled pipe connecting the hydraulic members.

4. In a hydraulic accumulator, the combination of a main hydraulic cylinder, a weighted movable tubular ram working therein, a fixed ram fitting the bore of the movable ram, and means for effecting the flow of fluid under pressure from the main cylinder to the interior of the movable ram.

5. In a hydraulic accumulator, the combination of a main hydraulic cylinder, a movable tubular ram working therein, a fixed ram fitting the bore of the movable ram, means for effecting the flow of fluid under pressure from the main cylinder to the interior of the movable ram, a frame for receiving the reaction of the hydraulic members, and an annular weight surrounding and guided on said frame and suspended from the movable ram.

6. In a hydraulic accumulator, the combination of a supporting-pedestal, a frame for receiving the reaction of the hydraulic members, a main hydraulic cylinder, a movable ram working therein and bored to form an intensifier-cylinder, a weight connected to and carried by said ram, a fixed intensifier-ram fitting in the intensifier-cylinder, a hydraulic-pressure pipe leading into the main cylinder, and a valve-controlled branch pipe connecting said pressure-pipe with the intensifier-cylinder.

7. In a hydraulic accumulator, the combination of a supporting-pedestal, a frame having a trussed lower portion, guides connected to the trussed portion of the frame, a hydraulic cylinder connected to and supported on the pedestal, a movable ram fitting the cylinder, an annular weight surrounding the frame and traversing on the guides thereon, and suspension-rods by which the weight is hung below a point of support on the ram.

8. In a hydraulic accumulator, the combination of a frame, a hydraulic cylinder, a movable ram fitting the cylinder, an annular weight surrounding the frame and traversing on guides thereon, a sectional carrier having an annular body and projecting arms, and fitting a head or recess on the ram, a ring fitting a conical bearing-surface on the carrier, and suspension-rods connecting the arms of the carrier with the weight.

9. In a hydraulic accumulator, the combination of a supporting-pedestal, a frame and guides connected thereto, a hydraulic cylinder connected to and supported on the pedestal, a movable ram fitting the cylinder, an annular weight surrounding the frame and traversing on guides thereon, a sectional carrier having an annular body and projecting arms, and fitting between collars or shoulders on the ram, rings fitting conical bearing-surfaces on the ends of the carrier, connecting-bolts by which said rings are drawn to a bearing on the carrier, and suspension-rods connecting the arms of the carrier with the weight.

10. In a hydraulic accumulator, the combination of an annular weight-block, supporting-plates built into said block and provided with sockets for the reception of suspension-rods, and an annular tank surrounding the weight-block and supported on said plates.

11. In a hydraulic accumulator, the combination of a supporting-pedestal, a frame connected thereto, a sectional bearing-plate connected to the frame, a main hydraulic cylinder supported on said bearing-plate, an upper bearing-plate connected to the frame and inclosing the cylinder near its outer end, a tubular ram working in said cylinder, a bearing-plate connected to the upper end of the frame, a fixed intensifier-ram connected to said bearing-plate and entering the bore of the movable ram, an annular weight surrounding and guided on the frame, suspension-rods connecting said weight with the movable ram, a hydraulic-pressure pipe leading into the main cylinder, and a valve-controlled branch pipe connecting said pressure-pipe with the bore of the tubular ram.

CHAUNCEY N. DUTTON.

Witnesses:
PAUL F. DIETRICH,
JULES P. METZGER.